United States Patent
Fenigstein et al.

(10) Patent No.: US 9,106,851 B2
(45) Date of Patent: Aug. 11, 2015

(54) SINGLE-EXPOSURE HIGH DYNAMIC RANGE CMOS IMAGE SENSOR PIXEL WITH INTERNAL CHARGE AMPLIFIER

(71) Applicant: Tower Semiconductor Ltd., Migdal Haemek (IL)

(72) Inventors: Amos Fenigstein, Haifa (IL); Raz Reshef, Tel-Aviv (IL); Shay Alfassi, Ramot Menashe (IL); Guy Yehudian, Kfar Saba (IL)

(73) Assignee: Tower Semiconductor Ltd., Migdal Haemek (IL)

( * ) Notice: Subject to any disclaimer, the term of this patent is extended or adjusted under 35 U.S.C. 154(b) by 331 days.

(21) Appl. No.: 13/797,862

(22) Filed: Mar. 12, 2013

(65) Prior Publication Data

US 2014/0263950 A1  Sep. 18, 2014

(51) Int. Cl.
*H04N 5/378* (2011.01)
*H04N 5/355* (2011.01)
*H04N 5/3745* (2011.01)

(52) U.S. Cl.
CPC ............. *H04N 5/355* (2013.01); *H04N 5/3559* (2013.01); *H04N 5/3745* (2013.01)

(58) Field of Classification Search
CPC ........... H01L 27/14609; H04N 5/3559; H04N 5/374; H04N 5/3745
See application file for complete search history.

(56) References Cited

U.S. PATENT DOCUMENTS

| | | | |
|---|---|---|---|
| 5,742,047 A | 4/1998 | Buhler et al. | |
| 5,774,181 A | 6/1998 | Shyu et al. | |
| 6,351,283 B1 | 2/2002 | Liu | |
| 7,075,049 B2 | 7/2006 | Rhodes et al. | |
| 7,800,673 B2 | 9/2010 | Sugawa et al. | |
| 8,203,111 B2 | 6/2012 | Reshef et al. | |

(Continued)

FOREIGN PATENT DOCUMENTS

| WO | 2005/101816 A1 | 10/2005 | |
|---|---|---|---|
| WO | WO2008103257 | * | 2/2008 |

OTHER PUBLICATIONS

Kemna, A. et al.: "Low Noise, Large Area CMOS X-Ray Image Sensor for C.T. Application", 2003 IEEE, 0-7803-8133-5/03, pp. 1260-1265.

(Continued)

*Primary Examiner* — Tony Ko
(74) *Attorney, Agent, or Firm* — Bever, Hoffman & Harms, LLP (57) ABSTRACT

A single-exposure high dynamic range (HDR) image sensor utilizes a charge amplifier having two different charge-to-voltage conversion capacitors that read a single photodiode charge during a two-phase readout operation. The first capacitor has a lower capacitance and therefore higher conversion gain (sensitivity), and the second capacitor has a higher capacitance and therefore lower conversion gain (sensitivity). The two-phase readout operation samples the photodiode charge twice, once using the high sensitivity capacitor and once using the low sensitivity capacitor. The high sensitivity readout phase provides detailed low light condition data but is saturated under brighter light conditions, and the low sensitivity readout phase provides weak data under low light conditions but provides high quality image data under brighter light conditions. The final HDR image is created by combining both high and low sensitivity images into a single image while giving each of them the correct weighted value.

21 Claims, 9 Drawing Sheets

(56) References Cited

U.S. PATENT DOCUMENTS

| | | | |
|---|---|---|---|
| 2006/0146159 A1* | 7/2006 | Farrier | 348/308 |
| 2006/0237631 A1* | 10/2006 | Koyama | 250/214 A |
| 2008/0018764 A1 | 1/2008 | Mizoguchi | |

OTHER PUBLICATIONS

Lahav, Assaf, et al.: "Enhances X-Ray CMOS sensor panel for Radio and Fluoro applications using a low noise charge amplifier pixel with a Partially Pinned PD", IISW 2011, 4 pages.

* cited by examiner

SINGLE-EXPOSURE HIGH DYNAMIC RANGE CMOS IMAGE SENSOR PIXEL WITH INTERNAL CHARGE AMPLIFIER

FIELD OF THE INVENTION

This invention relates to CMOS image sensors, and more particularly to High Dynamic Range (HDR) CMOS image sensors suitable for single exposure (e.g., X-Ray) applications.

BACKGROUND OF THE INVENTION

Sensor arrays are used, for example, in video cameras, and generally include a two dimensional array of pixels that is fabricated on a substrate. Each pixel includes a sensing element (e.g., a photodiode) that is capable of converting a portion of an optical (or other radiant source) image into an electronic (e.g., voltage) signal, and access circuitry that selectively couples the sensing element to control circuits dispose on a periphery of the pixel array by way of address and signal lines. In CMOS image sensors, which represent one type of sensor array, metal address and signal lines are supported in insulation material that is deposited over the upper surface of a semiconductor substrate, and positioned along the peripheral edges of the pixels to allow light to pass between the metal lines to the sensing elements through the insulation material. As with other sensor arrays, CMOS image sensors typically contain millions of pixels which transform photons coming from a photographed scene into millions of corresponding voltage signals, which are stored on a memory device and then read from the memory device and used to regenerate the optical image on, for example, a liquid crystal display (LCD) device.

Large area sensor arrays are used for medical imaging applications, and have many requirements that are not always applicable to "normal" (e.g., video camera) sensor arrays. First, large area image sensors must have pixel arrays that area much larger than "normal" arrays, both in the sense that the pixels are larger and total array area is very large. Second, large area sensor arrays must be able to operate in both a high resolution, low frame rate operating mode (e.g., to facilitate x-ray imaging) and in a low resolution, high frame rate operating mode (e.g., to facilitate scanning operation). In addition, high end analog performance such as noise and linearity is required. Finally, the cost of the large area sensor arrays must be minimal without performance compromise.

Conventional large area image sensors for medical x-ray applications are currently produced using a-Si:H technology and CMOS technology. Active Pixel TFT arrays that utilize a-Si:H technology typically include a 1T pixel including a photo-diode and a single transfer transistor. The TFT pixels typically transfer their charges to an off-chip charge amplifier (e.g., using one amplifier per column). A problem with this approach is that large arrays are sensitive to signal noise, and it is not possible using current a-Si:H technology to integrate a charge amplifier at the pixel level.

Large area CMOS image sensors overcome the problems associated with sensors that use a-Si:H technology in that the CMOS process allows for the inclusion of amplifier circuits within each pixel. However, some conventional large area CMOS image sensors utilize pixel level amplifiers that are formed in an integrator configuration, i.e., such that there is a current source per integrator. Therefore, a problem with this conventional large area CMOS image sensor approach is that power consumption may be too high for practical large pixel array applications. Other MOS based large area image sensors use charge amplifiers having complex circuitry and control signals that degrade production yields and, as a result, profitability. In addition, this complex circuitry reduces pixel fill-factor, which means less light will be collected and SNR will be degraded.

High dynamic range (HDR) imaging allows for high quality image with both low and high light conditions in the same scene. At least one conventional HDR imaging architecture, e.g., as described in U.S. Pat. No. 7,075,049, Rhodes, Dual Conversation Gain Imagers, utilizes a dual conversion gain approach to obtain the desired HDR imaging results under different lighting conditions i.e., see Rhodes claim 1. The conventional approach described in Rhodes is based on the well known fully pinned 4T pixel scheme and not charge amplifier configuration. The implementation of an HDR scheme based on dual gain using fully pinned 4T scheme suffers from a few drawbacks. The process needed for fully pinned photodiode with good transfer characteristics is usually involved and expensive. It is hard to achieve large full well capacity, in the range of several hundred thousand electrons and more, which are needed for instance in X-ray applications, and the transfer time for large photodiodes in the range of tens of micrometers can be quite long (tens of microseconds) limiting the speed of the sensor. All those are removed in the present invention. The present invention preserves the low noise using partially pinned photodiode, and uses the dual gain in a similar way to achieve the high dynamic range performance. However, the partially pinned photodiode needs only two additional implant layers. Furthermore, the charge amplifier scheme transfer charge without the need to transfer the actual collected electrons in the diode as there are many free electrons in the diode area which is not pinned. This is much faster process and does not limit the sensor speed.

What is needed is a low cost, large area CMOS image sensor with high end analog performance that overcomes the problems associated with conventional large area image sensors while allowing for HDR performance.

SUMMARY OF THE INVENTION

The present invention is directed to a single-exposure high dynamic range (HDR) image sensor in which each pixel utilizes a charge amplifier having two or more different charge-to-voltage conversion capacitors that are used to measure a single photodiode charge during a multi-phase readout operation. In one embodiment a first "high sensitivity" capacitor of the charge amplifier has a lower capacitance and therefore higher conversion gain (sensitivity), and a second "low sensitivity" capacitor has a higher capacitance and therefore lower conversion gain (sensitivity). The multi-phase readout operation samples each photodiode charge two or more times (i.e., the charge generated by a single light exposure is sampled at least twice), where the high sensitivity capacitor is used at least once during a high sensitivity readout phase to convert the photodiode charge to a high sensitivity image voltage, and the low sensitivity capacitor (or a combination of the high and low capacitors) is used during a low sensitivity readout phase to convert the photodiode charge to a low sensitivity image voltage. The high sensitivity readout phase provides detailed low light condition data but is saturated under brighter light conditions, and the low sensitivity readout phase provides weak data under low light conditions but provides high quality image data under brighter light conditions. By sampling a single exposure (i.e., a single photodiode charge) using both high and low sensitivity readout phases, the present invention allows for higher frame rate and reduced motion artifact compared to solutions which require two separate exposures. This single exposure HDR readout approach is also highly beneficial in applications, such as X-Ray procedures, where a minimum number of exposures is important (i.e., exposing patients to any more X-ray doses than necessary can be harmful). A final HDR image value is then generated for the single photodiode charge by the readout (or other logic) circuit by processing the readout signals generated during the multi-phase readout operation using a selected data processing technique. In one specific embodiment, the final HDR image value is generated as a weighted average over the whole light range by adjusting the measured high and low sensitivity image values for each photodiode charge using a weighting formula, and then combining the adjusted values. Alternatively, the high sensitivity image data value may be utilized (alone) as the final HDR image value for photodiode charges below a predetermined light threshold, and using the low sensitivity image value as the final HDR image value for photodiode charges above that light threshold.

According to an aspect of the present invention, the internal charge amplifier of each pixel is implemented using a common-source configuration in which the two or more charge-to-voltage amplifier capacitors form a feedback of the common-source amplifier. Specifically, each pixel is coupled to a shared current source by way of a column signal line, and utilizes the supplied column current to convert from charge to voltage and to amplify the charge generated on the pixel's photodiode in response to a received image portion. The photodiode charge is coupled in an inverted manner to the signal line while being converted to two or more separate output voltages by high sensitivity capacitor and low sensitivity capacitor, which are coupled between the signal line and the photodiode. By implementing the charge amplifier utilizing a common source configuration, the resulting amplifier circuit is made small and simple, thereby maximizing pixel fill-factor and reducing yield loss. By utilizing one current source per column of pixels, the present invention reduces power consumption over conventional large area arrays that use integrator-type amplifier circuits. Accordingly, the present invention provides an arrangement that is suitable for producing low cost, large area, high resolution HDR CMOS image sensors having high end analog performance (i.e., low noise and high linearity) that are optimal, for example, for use in medical applications.

In accordance with an embodiment of the present invention, the charge amplifier includes an NMOS transistor that is coupled between the signal line and ground by way of a select transistor. By referencing both the photodiode and the NMOS amplifier transistor to the same local ground potential, the gate-to-source noise in the NMOS amplifier transistor is made very low, thereby facilitating high end analog performance.

In accordance with a disclosed specific embodiment of the present invention, each pixel includes minimal internal circuitry that operates in conjunction with the select transistor to facilitate pre-integration, integration and multiple readout operating phases. The internal circuitry includes a pull-up transistor connected between the system voltage ($V_{DD}$) and the gate terminal of the NMOS amplifier transistor, a transfer gate transistor connected between the photodiode and the gate terminal of the NMOS (amplifier) transistor, and a reset transistor is connected in parallel with the charge amplifier between the select transistor and the gate terminal of the NMOS (amplifier) transistor. During the pre-integration phase, the select transistor, transfer gate transistor, and reset transistor are turned on, thereby opening a path between the signal line and the photodiode to facilitate charging (resetting) the photodiode charge using a voltage generated across the NMOS amplifier transistor (i.e., the gate-to-source voltage of the common source NMOS transistor, which operates as a diode when the reset transistor is turned on to couple the gate and source of the NMOS transistor to the column current source). At the beginning of the integration phase, the transfer gate transistor is turned off to isolate the photodiode, causing the photodiode charge to decrease at a rate proportional to the amount of received light (i.e., relatively bright light causes a relatively rapid discharge, while relatively low light causes a relatively slow discharge). The select and reset transistors are turned off during the integration phase, and the pull-up transistor is turned on, thereby turning on the NMOS transistor to prevent leakage through the transfer gate during the integration portion of the readout operation. In one embodiment, the pull-up transistor is an NMOS transistor, and the select transistor is formed using an NMOS transistor connected in parallel with a PMOS transistor, where a select control signal is applied to the gate terminal of said NMOS transistor, and an inverse of said select control signal is applied to both a gate terminal of said PMOS transistor and to the NMOS pull-up transistor. Finally, a mode control NMOS transistor is provided to isolate the low sensitivity capacitor during the high sensitivity readout phase. The entire internal pixel circuitry is thus made small and simple, thereby maximizing pixel fill-factor and reducing yield loss. Near the end of the integration phase, the select transistor is turned on to re-activate the charge amplifier. The reset transistor is then turned on and a "reset level" readout signal (i.e., the signal generated by the charge amplifier absent the influence of the photodiode charge) is externally sampled. The high sensitivity readout phase then begins by turning off the reset transistor and the mode control transistor turning on the transfer gate transistor to transfer the final photodiode charge from the photodiode to the high sensitivity capacitor, thereby converting the photodiode charge to a high sensitivity voltage. The resulting high sensitivity readout signal is then sampled by readout circuitry connected to the signal line (i.e., external to the pixel). The low sensitivity readout phase then begins by turning on the mode control transistor, causing the photodiode charge to be shared by the high sensitivity capacitor and the low sensitivity capacitor, thereby generating a low sensitivity voltage. The resulting low sensitivity readout signal is then sampled by the readout circuitry connected to the signal line (i.e., external to the pixel). The readout circuitry then generates a final HDR image value for the photodiode charge using the "reset level", high sensitivity and low sensitivity readout values according to one of the signal processing techniques mentioned above.

According to yet another embodiment of the present invention, the image sensor uses a partially pinned photodiode (PPPD) structure including, in addition to an n-type photodiode implant region inside a p-type bulk, another shallow p-doped layer, known as a pinning implant layer over most of the n-type region. Only a small region surrounding the anode contact is left without the pinning layer. The pinning layer is grounded to the bulk. The n-type doping level is tuned such that close to reset voltage level the depletion regions of the two junctions, namely the n-type region junction with the bulk, and the n-type junction with the pinning layer coincide and leave the whole n-type region fully depleted, except for a small region surrounding the contact. Because further change in the anode voltage cannot modulate the depletion region in the full depleted area (also known as the "pinned area"), differential capacitance of the partially pinned photodiode vastly dropped at the pinning voltage. Such PPPD structures have the advantage of high capacitance for voltages lower than the pinning voltage, enabling large full well, and very low capacitance at voltages near the reset voltage such that kTC reset noise is minimized.

According to another embodiment of the invention, each pixel includes multiple photodiodes that are coupled to the MOS capacitors of the charge amplifier by associated transfer gates. This arrangement facilitates reading one photodiode at a time, or analog binning of two or more diodes, thus allowing for a dual application of the CMOS image sensor (i.e., either low resolution, high frame rate applications or high resolution applications). The photodiodes are fabricated using a large area format to improve fill-factor, but because the photodiode charge is integrated on the low and high sensitivity capacitors in feedback of the charge amplifier, high sensitivity is still obtained.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to an improvement in High Dynamic Range (HDR) CMOS image sensors. The following description is presented to enable one of ordinary skill in the art to make and use the invention as provided in the context of a particular application and its requirements. The terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection in a signal path between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 1:
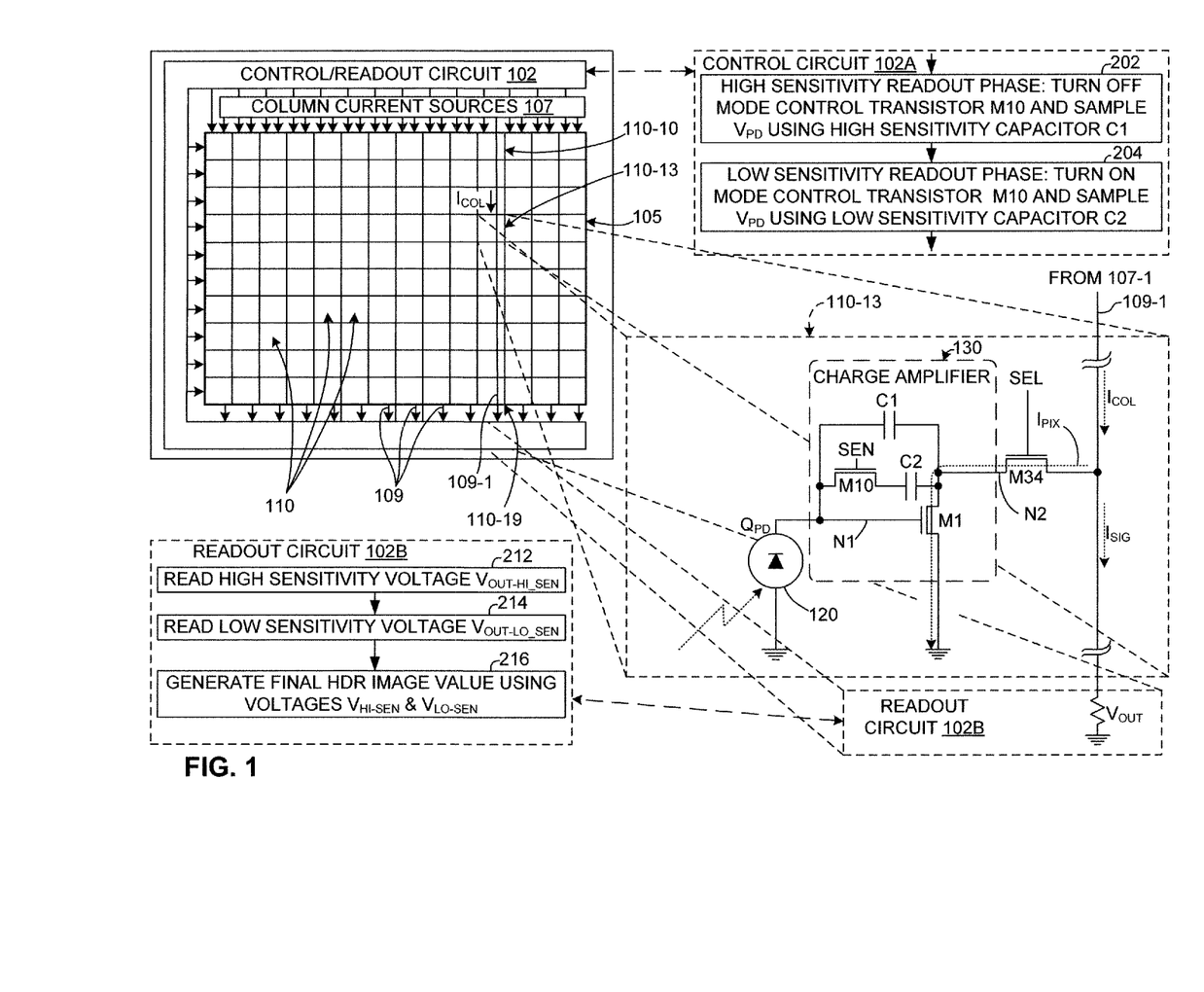
FIG. 1 is a simplified perspective diagram showing a CMOS image sensor according to an embodiment of the present invention.

FIG. 1 is a simplified diagram showing a single-exposure HDR CMOS image sensor 100 formed in accordance with a generalized embodiment of the present invention. CMOS image sensor 100 is similar to conventional CMOS image sensors in that it includes a pixel array 105 including pixels 110 arranged in rows and columns, and control/readout circuitry 102 that access, control and process signals received from each of the pixels by way of associated metal lines passing between the rows and columns of pixels 110. A simplified pixel 110-13, which is exemplary of all pixels 110, is shown in an enlarged fashion in the lower right portion of FIG. 1. Similar to conventional CMOS image sensors, each pixel 110 of CMOS image sensor 100 (e.g., pixel 110-13 includes at least one CMOS photodiode 120 and at least one select transistor (switch) M34. CMOS photodiode 120 is fabricated on a semiconductor (e.g. silicon) substrate using known techniques, and is controlled by reset circuitry and other control circuitry (omitted from FIG. 1 for illustrative purposes) to generate a photodiode charge $Q_{PD}$ at a (first) node N1 in accordance with a corresponding image portion. Select transistor M34 is connected between a signal line 109-1 and a (second) internal node N2 of pixel 110-13, and receives a select control signal SEL during the read operations that couples node N2 to signal line 109-1. The multiphase read operations mentioned above are initiated using select control signals and other control signals generated by control/readout circuit 102 according to timing characteristics described in further detail below, and transmitted to pixels 110 utilizing addressing schemes understood by those skilled in the art.

According to an aspect of the present invention, column current sources 107 supply a fixed column current on each associated column signal line 109, and each pixel 110 includes an internal charge amplifier 130 that utilizes a common source configuration in which the supplied column current is used to convert and amplify photodiode charge $Q_{PD}$ to voltage, and to transmit a corresponding amplified readout voltage $V_{OUT}$ by way of the associated column signal lines 109 to control/readout circuit 102. For example, pixels 110-10, 110-13 and 110-19 form a column that receives column current $I_{COL}$ by way of associated column signal line 109-1, with pixel 110-13 shown in the lower right portion of FIG. 1. Charge amplifier 130 of pixel 110-13 is coupled between nodes N1 and N2, and operates such that, during a read operation in which select switch M34 is turned on to allow current flow between signal line 109-1 and node N2, photodiode charge $Q_{PD}$ at node N1 is converted to a voltage and amplified by charge amplifier 130 to produce a corresponding amplified output signal $V_{OUT}$ in an associated portion (represented by a resistor in FIG. 1) of control/readout circuit 102 (i.e., the voltage at node N1 is set by gate-source voltage of M1 and column current $I_{COL}$—it is considered a "virtual ground" of charge amplifier 130). With this arrangement, for example, when a relatively small amount of light is received by photodiode 120, a proportionally low (or high) amplified pixel output signal $V_{OUT}$ is received by readout circuitry 102 and converted to data identifying the relatively small amount of light. Conversely, when a relatively bright light is received by photodiode 120, a corresponding a proportionally high (or low) amplified pixel output signal $V_{OUT}$ is generated that is converted by readout circuitry 102 to data identifying the relatively bright light. As illustrated by the examples set forth below, by implementing charge amplifier 130 utilizing this common source configuration, the resulting amplifier circuit is made small and simple, thereby maximizing pixel fill-factor and reducing yield loss.

According to another aspect of the present invention, each charge amplifier 130 in pixels 110 includes two different charge-to-voltage conversion capacitors that are utilized in conjunction with a mode control circuit to measure a single photodiode charge $Q_{PD}$ during a multi-phase readout operation. In the embodiment shown in FIG. 1, charge amplifier 130 of pixel 110-13 includes two capacitors: a high sensitivity (first) capacitor C1 that is connected between nodes N1 and N2, and a low sensitivity (second) capacitor C2 that is coupled to node N1 by way of NMOS mode control transistor M10. High sensitivity capacitor C1 has a lower capacitance than low sensitivity capacitor C2, and therefore has a higher conversion gain (sensitivity). Conversely, low sensitivity capacitor C2 has a higher capacitance than capacitor C1, and therefore a lower conversion gain (sensitivity). The effective capacitance of charge amplifier 130 is controlled by coupling/de-coupling low sensitivity C2 from node N1 by way of mode control transistor M10, which is activated (turned on) and de-activated (turned off) by a mode control signal SEN generated by control circuit 102A. As indicated by block 202 located in the top right portion of FIG. 1, with this arrangement, the high sensitivity readout phase involves de-activating mode control signal SEN such that low sensitivity capacitor C2 is de-coupled from node N1, and then sampling photodiode charge $Q_{PD}$, which at this point is stored only on capacitor C1. Subsequently, as indicated by block 204, the low sensitivity readout phase involves activating mode control signal SEN such that low sensitivity capacitor C2 is coupled to node N1 (i.e., in parallel with capacitor C1), which causes photodiode charge $Q_{PD}$ to be stored on both capacitors C1 and C2, and then re-sampling photodiode charge $Q_{PD}$. The high sensitivity readout phase provides detailed low light condition data but is saturated under brighter light conditions, and the low sensitivity readout phase provides weak data under low light conditions but provides high quality image data under brighter light conditions. By sampling a single exposure (i.e., photodiode charge $Q_{PD}$) using both high and low sensitivity readout phases (i.e., using only high sensitivity capacitor C1 during one phase, and then using low sensitivity capacitor C2 during the second phase), the present invention allows for higher frame rate and reduced motion artifact compared to solutions which require two separate exposures. This single exposure HDR readout approach is also highly beneficial in applications, such as X-Ray procedures, where a minimum number of exposures is important (i.e., exposing patients to any more X-ray doses than necessary can be harmful).

According to another aspect of the present invention, a final HDR image value is then generated for photodiode charge $Q_{PD}$ utilizing at least one of the two readout voltages produced during the high sensitivity readout phase and the low sensitivity readout phase. Referring to the lower left portion of FIG. 1, in one embodiment readout circuit 102B is configured to read and store a high sensitivity readout value $V_{OUT\text{-}HI\_SEN}$ (block 212) during the high sensitivity readout phase, to read and store a low sensitivity readout value $V_{OUT\text{-}LO\_SEN}$ (block 214) during the low sensitivity readout phase, and to then to generate a final HDR image value using values $V_{OUT\text{-}HI\_SEN}$ and $V_{OUT\text{-}LO\_SEN}$ (block 216) according to a predetermined signal processing technique. For example, the final HDR image value is generated by adjusting one or both of high sensitivity image value $V_{OUT\text{-}HI\_SEN}$ and low sensitivity image value $V_{OUT\text{-}LO\_SEN}$ in accordance with a predetermined weighting formula, and then combining the adjusted values to generate final HDR image value as a weighted average over the whole light range. According to an alternative signal processing technique, high sensitivity image data value $V_{PD\text{-}HI\_SEN}$ is utilized (alone) as the final HDR image value for photodiode charges below a predetermined light threshold, and low sensitivity image value $V_{PD\text{-}LO\_SEN}$ is utilized as the final HDR image value for photodiode charges above that light threshold.

Figure 7:
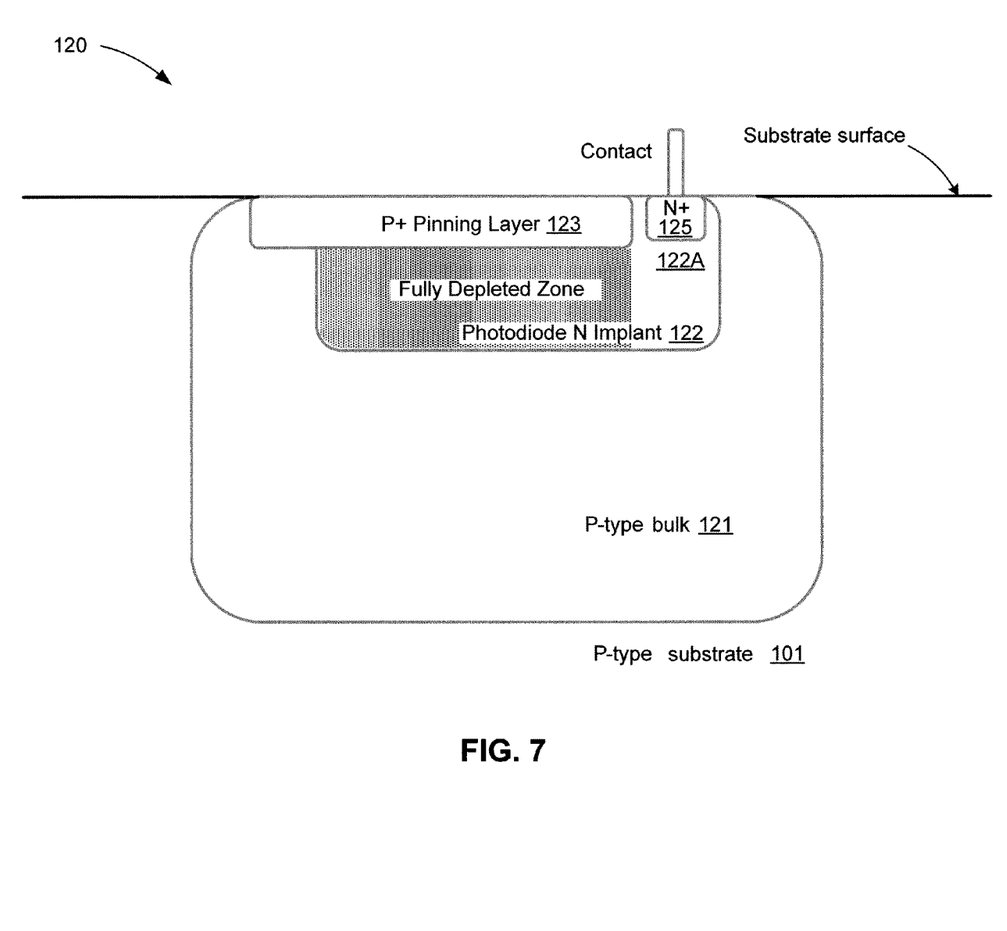
FIG. 7 is a simplified cross-sectional side view showing an exemplary pinned photodiode utilized in accordance with another specific embodiment of the present invention.

According to an embodiment of the present invention, photodiode 120 of each pixel 110 is formed such that the diode capacitance of each photodiode is non-linear (i.e., such that each photodiode's differential capacitance is very low at the reset level to reduce kTC noise, and is much higher for lower voltages in order to have high full well capacitance). In accordance with a specific embodiment, in order to achieve this goal, photodiode 120 is formed using a partially pinned photodiode (PPPD) structure, such as that depicted in FIG. 7. PPPD 120 is formed by doped regions implanted into substrate 101 and includes, in addition to an n-type photodiode implant region 122 formed inside a p-type bulk region 121, another shallow p-doped layer, known as a pinning implant layer 123, which is disposed over most of n-type region 122 and is ground to bulk region 121. N-type region 122 includes a small region 122A that bypasses pinning implant layer 123 and contacts N+ anode contact 125. As indicated by the shaded "Fully Depleted Zone" portion of FIG. 7, the n-type doping level is tuned such that, close to the reset voltage level, the depletion regions of the two junctions, namely the n-type region junction with the bulk, and the n-type junction with the pinning layer coincide and leave the whole n-type region fully depleted, except for a small region surrounding the contact. Because further change in the anode voltage cannot modulate the depletion region in the full depleted area (also known as the "pinned area"), differential capacitance of the partially pinned photodiode vastly drop at the pinning voltage. Such PPPD structures have the advantage of high capacitance for voltages lower than the pinning voltage, enabling large full well, and very low capacitance at voltages near the reset voltage such that kTC reset noise is minimized.

According to the exemplary embodiment of as indicated by pixel 110-13 in FIG. 1, charge amplifier 130 includes an NMOS amplifier transistor M1 connected between (second) node N2 and ground (first voltage source), with its gate terminal coupled to the first node N1, and a MOS capacitor C connected between nodes N1 and N2 (i.e., between the gate and drain terminals of NMOS amplifier transistor M1). With this particular arrangement, photodiode charge $Q_{PD}$ is applied to the gate terminal of NMOS transistor M1. NMOS transistor M1 thus functions as an amplifier with a closed-loop capacitive feedback its source terminal (connected to ground) serving as a positive input and its gate terminal serving as a negative input terminal and "virtual ground" node. The only minor changes in gate voltage of NMOS transistor M1 are due to finite gain of the common source amplifier implemented by NMOS transistor M1. For example, to produce a given change "X" on signal line 109-1, the charge on node N1 needs to change by X/A, where A is the open loop gain of charge amplifier 130. Since the gate voltage of NMOS transistor M1 stays almost constant, the charge on node N1 is coupled in an inverted manner to node N2 while being converted to voltage through capacitor C1 (or capacitors C1 and C2), which are selectively coupled between signal line and photo-diode (i.e., the feedback of the common source amplifier) in the manner described herein. By implementing charge amplifier 130 utilizing NMOS amplifier transistor M1 configured in this manner, amplification of photodiode charge $Q_{PD}$ is achieved with minimal circuitry, thereby maximizing pixel fill-factor and reducing yield loss. In addition, by referencing both photodiode 120 and NMOS transistor M1 to the same local ground potential, the gate-to-source noise in the NMOS transistor M1 is minimized, thereby facilitating high end analog performance.

Figure 2:
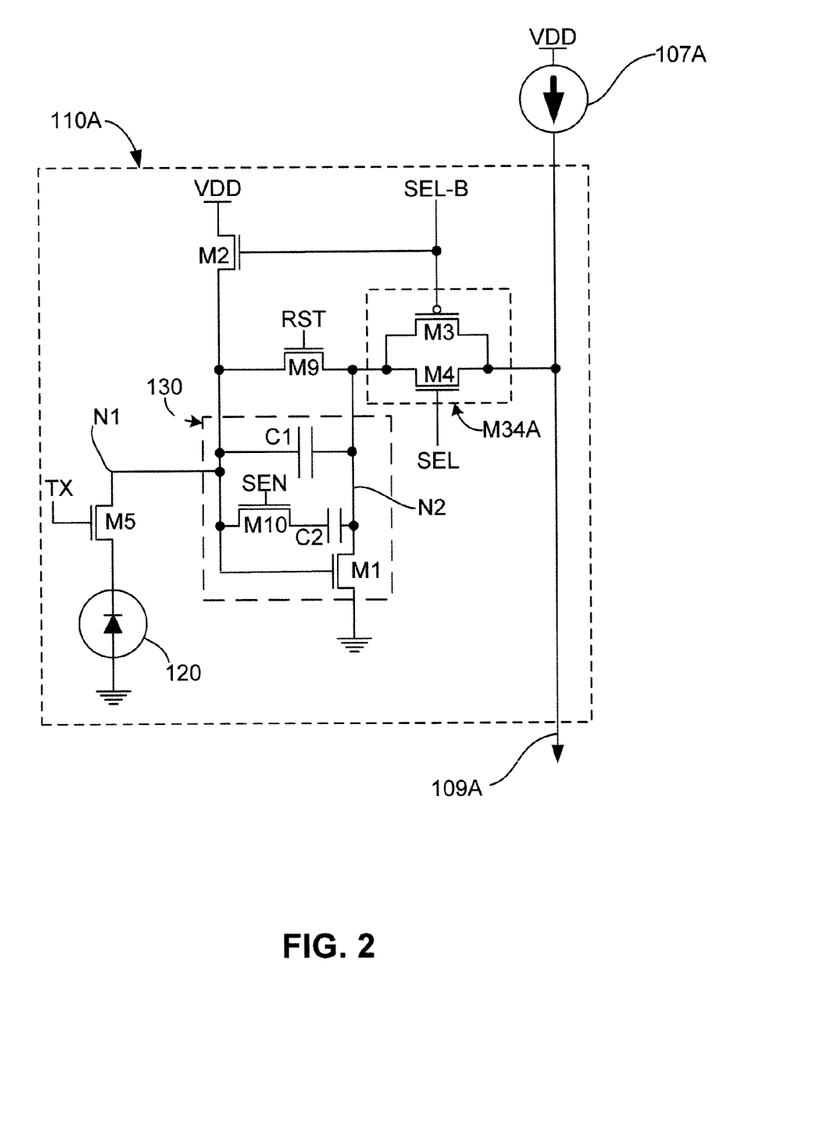
FIG. 2 is a simplified circuit diagram showing a pixel of a CMOS image sensor according to a specific embodiment of the present invention.

FIG. 2 is a simplified circuit diagram showing a pixel 110A of a CMOS image sensor formed in accordance with a specific embodiment of the present invention. Pixel 110A is utilized, for example, in place of pixel 110-13 in FIG. 1, and is addressed by corresponding control/readout circuitry similar to that described above with reference to FIG. 1. Pixel 110A includes a select switch M34A, a photodiode 120, and a charge amplifier 130 that are connected to a signal line 109A and arranged in a manner similar to that described above with reference to pixel 110-13 (described above with reference to FIG. 1), and includes internal circuitry (described below) that operates in conjunction with select transistor M34A to facilitate pre-integration, integration and readout operating phases, which are also described below. The additional internal circuitry of pixel 110-13 includes an NMOS pull-up transistor M2 connected between system voltage $V_{DD}$ and the gate terminal of NMOS (amplifier) transistor M1, an NMOS transfer gate transistor M5 connected between the photodiode 120 and the gate terminal of NMOS amplifier transistor M1, and an NMOS reset transistor M9 is connected in parallel with the charge amplifier between the select transistor and the gate terminal of NMOS amplifier transistor M1.

The operation of pixel 110A, which is described below with reference to the timing diagrams provided in FIGS. 3(A) to 3(E), involves transmitting control signals to select switch M34A, reset transistor M9, transfer gate transistor M5, and mode control transistor M10. In the present embodiment, select switch M34A is formed by an NMOS transistor M4 connected in parallel with a PMOS transistor M3, where a select control signal SEL (e.g., described below with reference to FIG. 3(C)) is applied to the gate terminal of NMOS transistor M4, and control signal SEL-B (i.e., "SEL-bar", or the inverse of control signal SEL) is applied to both the gate terminal of PMOS transistor M3 and to the NMOS pull-up transistor M2. NMOS reset transistor M9 is controlled by a reset control signal RST (described below with reference to FIG. 3(A)), and NMOS transfer gate transistor M5 is controlled by a transfer gate control signal TX (described below with reference to FIG. 3(B)).

Figure 3A:
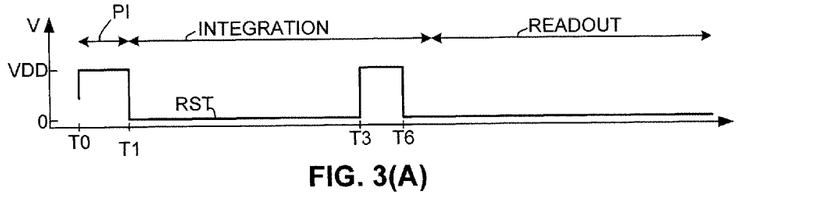
FIGS. 3(A), 3(B), 3(C), 3(D) and 3(E) are timing diagrams showing control signals transmitted to the pixel of FIG. 2 during operation.

As indicated at the top of FIG. 3(A), each readout operation of pixel 110A includes a pre-integration (PI) phase, an integration phase, and a readout phase. These operating phases are described below with reference to FIGS. 4(A) to 4(E), which show corresponding operating states of the various transistors of pixel 110A during the associated operating phases.

Figure 3B:
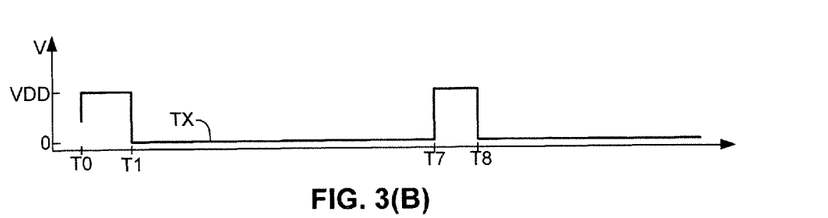
Figure 3C:
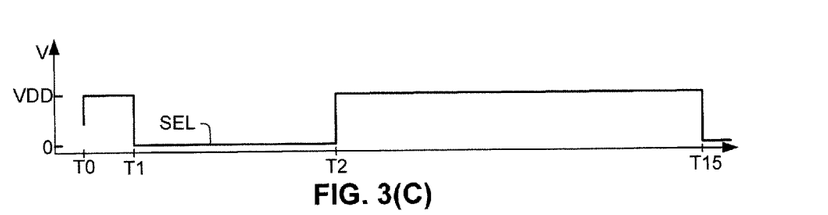
Figure 3D:
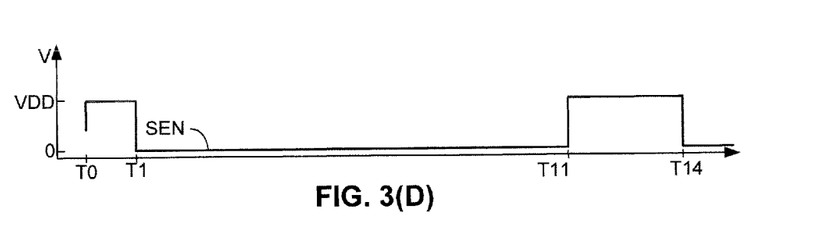
Figure 4A:
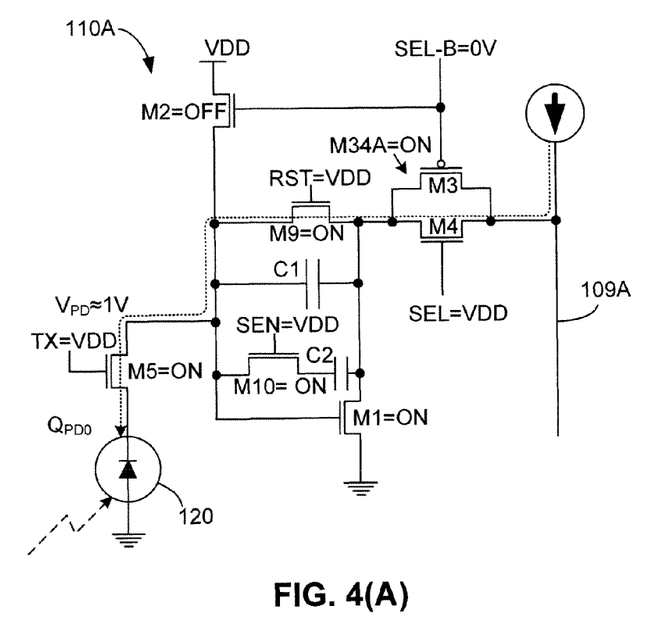
FIGS. 4(A), 4(B), 4(C), 4(D) and 4(E) are simplified circuits diagram showing operating states within the pixel of FIG. 2 during operation.

Referring to the left side of FIGS. 3(A) to 3(D), during the pre-integration phase of operation (i.e., between time T0 and T1), each of reset control signal RST, transfer gate control signal TX, select control signal SEL, and mode control signal SEN are toggled high. As indicated in FIG. 4(A), these high control signals cause select switch M34A, transfer gate transistor M5, reset transistor M9 and mode control transistor M10 to turn on, thereby opening a path between signal line 109A and photodiode 120 that facilitates charging (resetting) photodiode 120 to an initial photodiode charge $Q_{PD0}$ using a voltage across photodiode of about 1V. In this operating state, the gate and drain of NMOS amplifier transistor M1 are maintained at essentially the same voltage (i.e., there is no voltage drop across reset transistor M9), and NMOS amplifier transistor M1 functions as a diode (i.e., the gate-to-source voltage of common source NMOS amplifier transistor M1, when it is connected in diode configuration via reset transistor M9 (on) and charged by column current source 107A, generates a fixed "diode" voltage of approximately 1V at nodes N1 and N2). Note that by keeping the "diode" voltage $V_{PD0}$ (e.g., approximately 1V) applied to photodiode 120 during the reset phase below VDD provides two main advantages over conventional systems that reset using VDD or other higher voltages. First, resetting photodiode 120 is done by a limited column current, so a large current spike while resetting a row of pixels is prevented (this is especially important in large arrays). Second, as discussed below with reference to the readout phase, because the readout (output) voltages are higher that the "reset level" output voltage (which is equal to the "diode" voltage), the low reset level provided by the "diode" voltage provides a large voltage window for signal voltage range. This large voltage range allows for a high resolution A/D circuit to sample the pixel output. Note also that the high select control signal SEL requires that inverse control signal SEL-B is low, thereby turning off pull-up transistor M2.

Figure 4B:
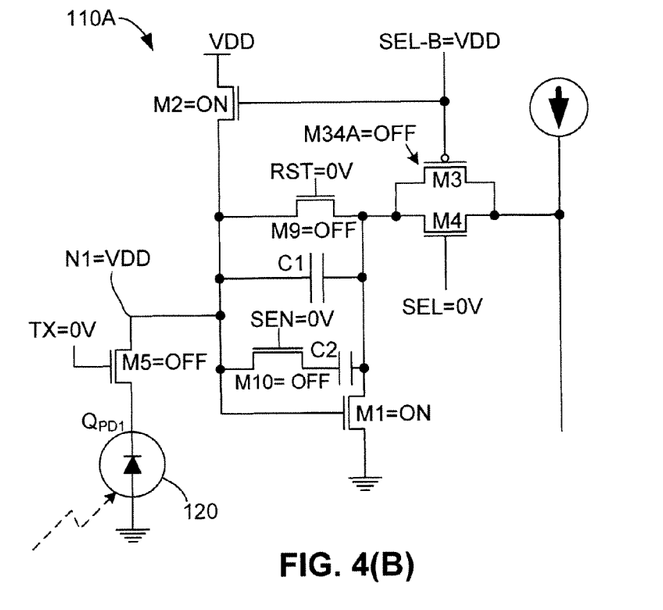

Referring again to FIGS. 3(A) to 3(D), at the beginning of the integration phase (at time T1), each of reset control signal RST, transfer gate control signal TX, mode control signal SEN and select control signal SEL are toggled low. Referring to FIG. 4(B), these low control signals cause select switch M34A, transfer gate transistor M5, and reset transistor M9 to turn off, thereby isolating photodiode 120, causing photodiode charge $Q_{PD1}$ (i.e., the photodiode charge early in the integration phase) to decrease at a rate proportional to the amount of received light (i.e., relatively bright light causes a relatively rapid discharge, while relatively low light causes a relatively slow discharge). In addition, with select switch M34A turned off, the pull-up transistor M2 is turned on, thereby turning on the NMOS amplifier transistor M1 to prevent leakage through the transfer gate M5 during the integration phase.

Figure 3E:
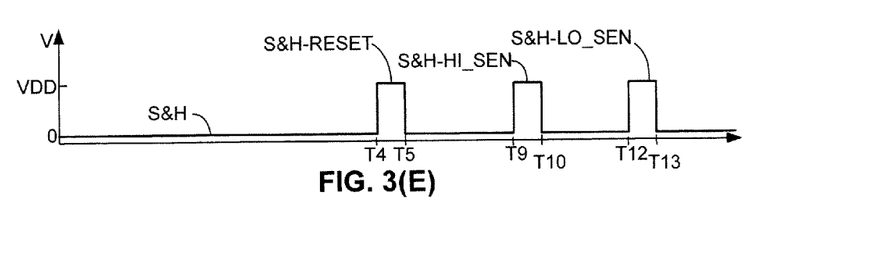
Figure 4C:
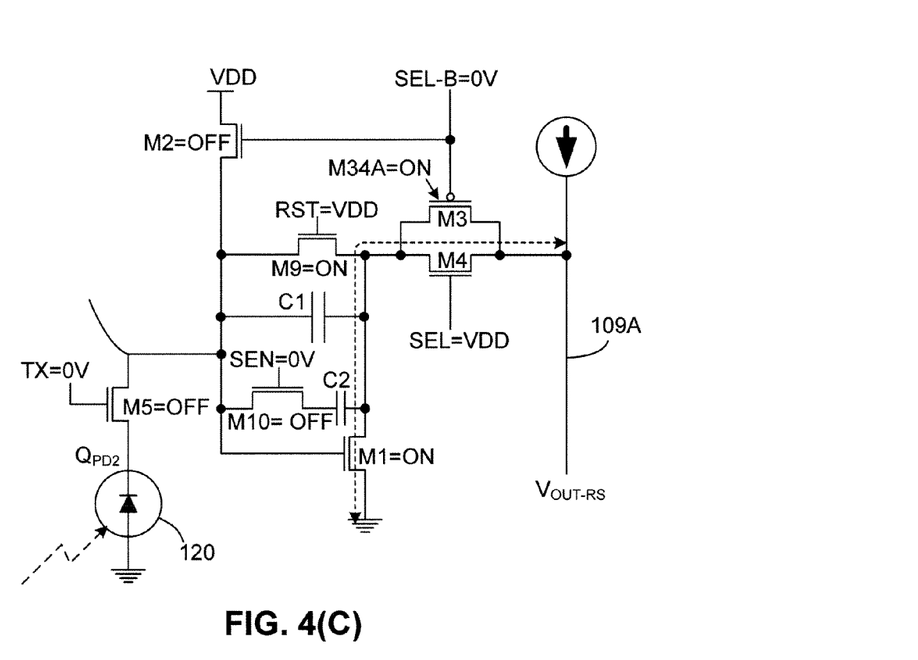
Figure 4D:
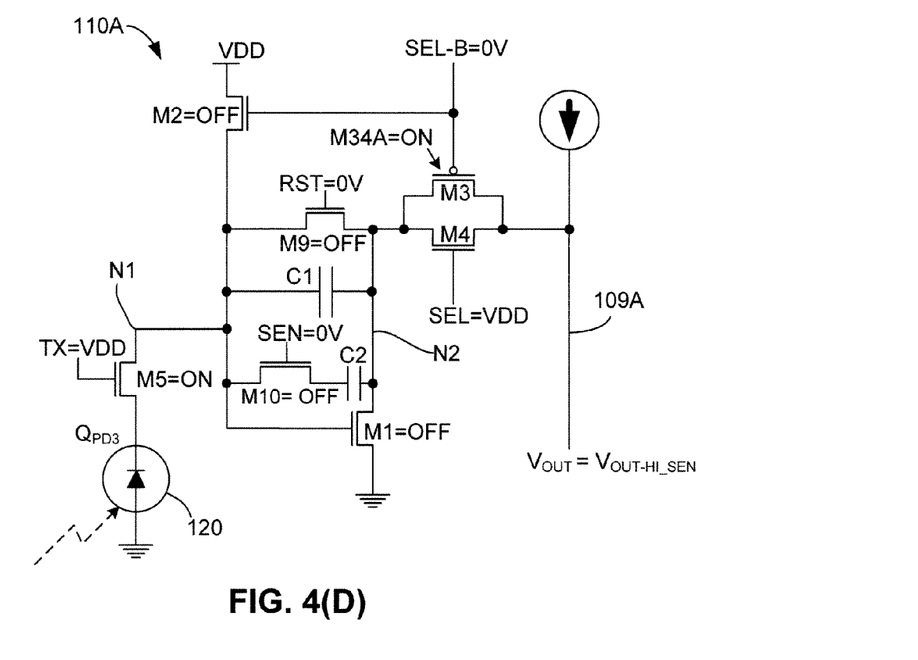
Figure 4E:
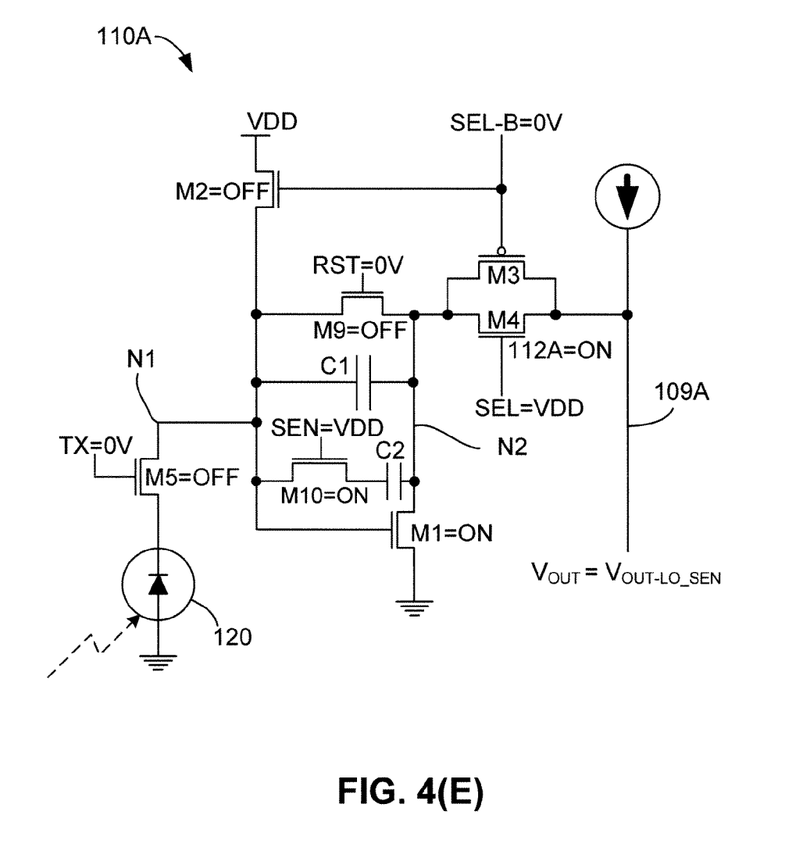

A "reset level" reading is then performed near the end of the integration phase. Referring again to FIG. 3(C), after a portion the integration phase has elapsed (i.e., at time T2), select control signal SEL toggles high to turn on select switch M34A, thereby re-activating charge amplifier 130A (i.e., coupling node N2 to signal line 109A). Note that this action causes pull-up transistor M2 to turn off. A short time later (time T3, FIG. 3(A)), reset control signal RST toggles high to turn on reset transistor M9, thereby charging the gate-to-source voltage of NMOS amplifier transistor M1 (node N1) according to the column current source level by way of select switch M34A and reset transistor M9, as depicted in FIG. 4(C). Note again that NMOS amplifier transistor M1 functions as a diode, and the pixel's "reset level" output signal $V_{OUT-RS}$ at this time is equal to the "diode" voltage (i.e., approximately 1V). The "reset level" output signal $V_{OUT-RS}$ varies from pixel to pixel due to the Vt variation of NMOS transistors M1 from pixel to pixel. However, performing a reset read operation before each multi-phase readout operation provides a correlated pixel value (i.e., the difference between the "signal level" and the "reset level" value). That is, a higher "diode" voltage ("reset level" value) will result in a higher "signal level" values (i.e., the high and low sensitivity readout signals) for the same amount of light collected by a given photodiode, and a lower "diode" voltage will result in lower "signal level" values for the same amount of light collected by that photodiode. A reset sample/hold operation "S&H-RESET" is performed between time T4 and T5 (see FIG. 3(E)) while reset signal RST is asserted, and then reset control signal RST is toggled low (time T6, FIG. 3(A)).

The multi-phase readout phase of the operation is then performed to read "signal level" values associated with a final photodiode charge $Q_{PD}$ stored on photodiode 120 in response to the light received during the integration phase. Referring to FIG. 3(B), transfer gate control signal TX is asserted at the beginning of the high sensitivity readout phase (time T7), which turns on transfer gate M5 to couple photodiode 120 to node N1 (see FIG. 4(D)). A predetermined time period is allowed for transferring photodiode charge $Q_{PD3}$ (i.e., the photodiode charge on photodiode at time T7) to capacitor C1, which in turn controls NMOS amplifier transistor M1 to generate high sensitivity readout signal $V_{OUT\text{-}HI\_SEN}$ on signal line 109A. A high sensitivity sample/hold operation "S&H-HI_SEN" is performed between times T9 and T10 (see FIG. 3(E)) while mode control signal SEN remains low (i.e., mode control transistor M10 remains off). Referring to FIG. 3(E), mode control signal SEN is asserted at the beginning of the low sensitivity readout phase (time T11), which turns on mode control transistor M10 to couple capacitor C2 to node N1 (see FIG. 4(D)). A predetermined time period is allowed for the transferred photodiode charge to be distributed between (i.e., shared by) capacitors C1 and C2, which in turn generates low sensitivity readout signal $V_{OUT\text{-}LO\_SEN}$ on signal line 109A. A low sensitivity sample/hold operation "S&H-LO_SEN" is performed between times T12 and T13 (see FIG. 3(E)) while mode control signal SEN remains high (i.e., mode control transistor M10 remains turned on). Subsequently, mode control signal SEN is de-asserted at time T14 (FIG. 3(D)), and then select control signal SEL is subsequently de-asserted (time T15; see FIG. 3(C)) to end the multi-phase readout operation.

Figure 5:
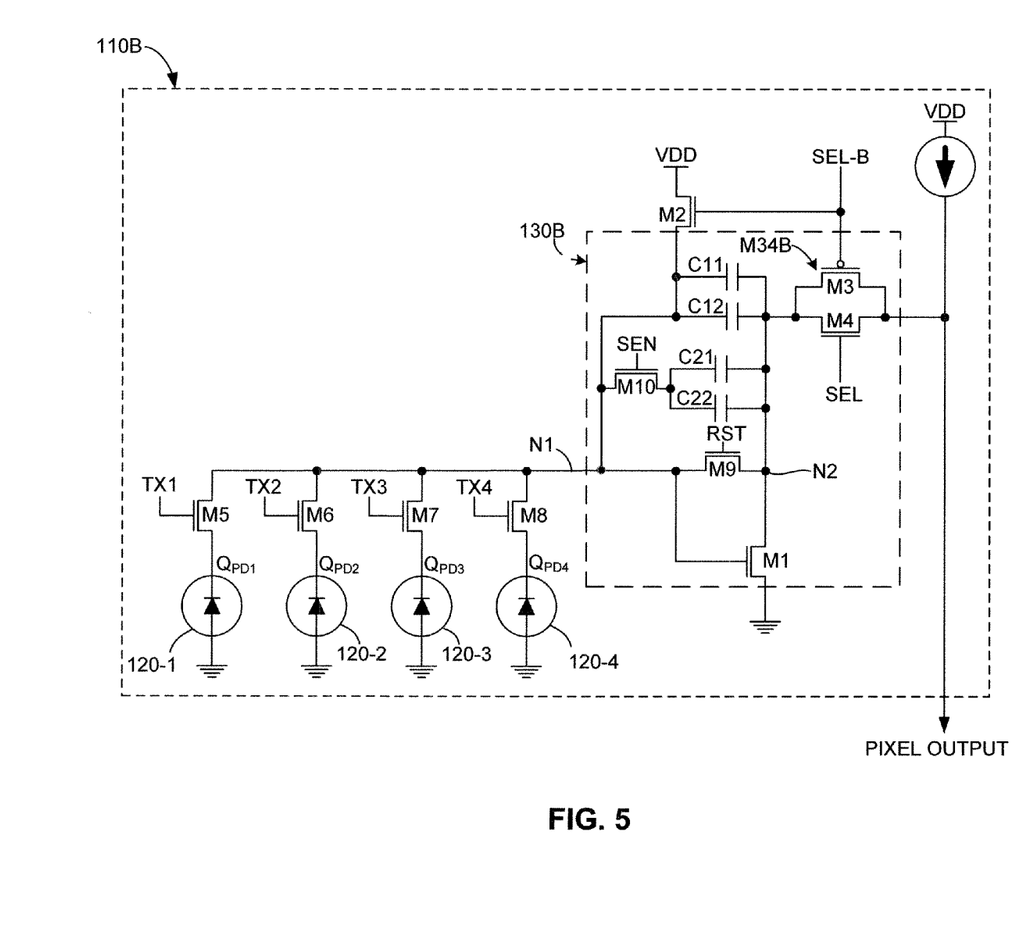
FIG. 5 is a simplified circuit diagram showing a pixel of a CMOS image sensor according to another specific embodiment of the present invention.

FIG. 5 is a simplified circuit diagram showing a pixel 110B of a CMOS image sensor formed in accordance with another specific embodiment of the present invention, and is utilized, for example, in place of pixel 110-13 in FIG. 1. Pixel 110B includes a select switch M34B, an NMOS amplifier transistor M1, an NMOS pull-up transistor M2, and a reset transistor M9 that are arranged and operate substantially as described above with reference to pixel 110A, so further description of these elements is omitted for brevity.

According to an aspect of the embodiment shown in FIG. 5, charge amplifier 130B includes two high sensitivity MOS capacitors C11 and C12 that are connected in a back-to-back (parallel) arrangement between the drain and gate terminals of NMOS transistor M1 (e.g., between the signal line 109-1 and photodiode 120), and two high-sensitivity MOS capacitors C21 and C22 that are connected in a back-to-back (parallel) arrangement between transistor M10 and the drain of NMOS transistor M1. By implementing at least one of the high sensitivity capacitor (e.g., capacitor C1 shown in FIG. 1) and the low sensitivity capacitor (e.g., capacitor C2 shown in FIG. 1) using two or more MOS capacitors in a back-to-back arrangement, CMOS image sensors formed in accordance with present invention exhibit excellent voltage linearity on pixel output voltage $V_{OUT}$, compared to conventional pixels that use diode capacitance for charge integration, or compared to embodiments of the present invention that use single capacitors.

According to another aspect of the embodiment shown in FIG. 5, pixel 110B includes multiple photodiodes 120-1 to 120-4 that are coupled to node N1 by associated transfer gates M5 to M8. This arrangement facilitates reading one photodiode at a time (i.e., sequentially reading photodiodes 120-1 to 120-4 by sequentially turning on transfer gates M5 to M8 during four separate readout operations), or by the analog binning of two or more diodes (e.g., reading photodiodes 120-1 and 120-2 by turning on transfer gates M5 and M6 while transfer gates M7 and M8 are turned off, and then reading photodiodes 120-3 and 120-4 by turning on transfer gates M7 and M8 while transfer gates M5 and M6 are turned off), thus allowing for a dual application of the CMOS image sensor (i.e., either low resolution, high frame rate applications or high resolution applications). Photodiodes 120-1 to 120-4 are fabricated using a large area format to improve fill-factor, but because their respective photodiode charges are integrated on capacitors C11 to C22 in the manner described above, high sensitivity is still obtained.

Figure 6:
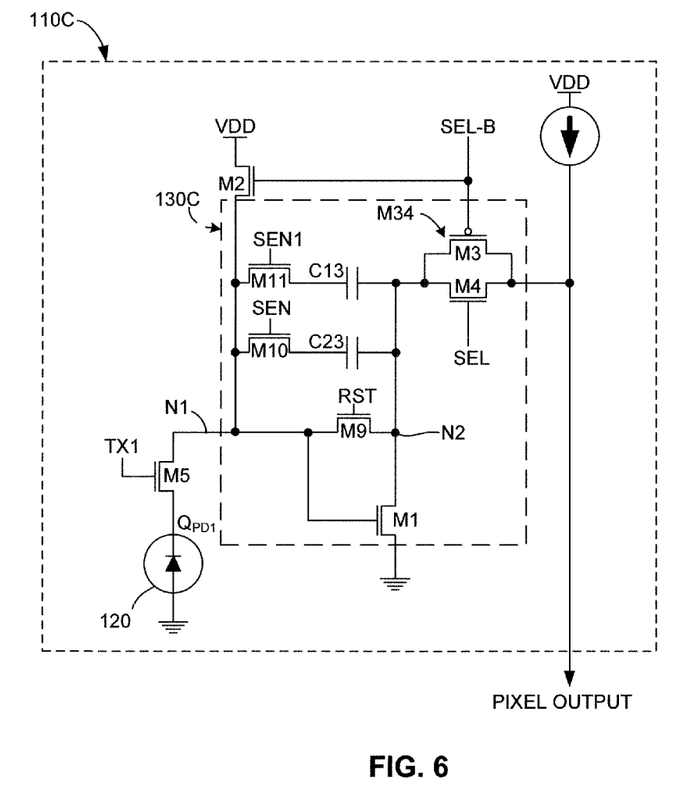
FIG. 6 is a simplified circuit diagram showing a pixel of a CMOS image sensor according to another specific embodiment of the present invention.

Although the present invention has been described with respect to certain specific embodiments, it will be clear to those skilled in the art that the inventive features of the present invention are applicable to other embodiments as well, all of which are intended to fall within the scope of the present invention. For instance, although the present invention is described with reference to certain charge amplifier circuit arrangements, those skilled in the art will recognize that equivalent charge amplifier circuits may be utilized that intended to fall within the spirit and scope of the claims, unless otherwise limited. For example, as indicated by CMOS image sensor 100C in FIG. 6, where a charge amplifier 130C includes an additional mode control transistor M11 may be implemented between node N1 and high sensitivity capacitor C13 and controlled by a separate mode control signal SEN1 to isolate capacitor C1, for example, during the low sensitivity readout phase. Note that low sensitivity capacitor C23 remains coupled between nodes N1 and N2 by way of mode control transistor M10, which is controlled by mode control signal SEN in the manner describe above, and all remaining gates and control signals operate in the manner described above.

The invention claimed is:

1. A CMOS image sensor comprising:
    at least one current source for generating a predetermined signal current on a signal line; and
    a first pixel including:
    a photodiode connected between a first voltage source and a first node; and
    a select transistor connected between the signal line and a second node;
    a charge amplifier coupled between the first node and the second node, the charge amplifier including:
        a first capacitor coupled between the first and second nodes;
        a second capacitor having a first terminal connected to the second node; and
        a mode control transistor connected between the first node and the second capacitor; and
    means for controlling the mode control transistor such that:
        during a first readout phase, the second capacitor is de-coupled from the first node and a photodiode charge generated by the photodiode during an integration period preceding the first readout phase is stored on the first capacitor, and
        during a second readout phase, the second capacitor is coupled to the first node such that at least a portion of the photodiode charge is stored on the second capacitor.

2. The CMOS image sensor of claim 1, further comprising means for generating a final HDR image value by processing a first readout signal generated on the signal line during the first readout phase and a second readout signal generated on the signal line during the second readout phase.

3. The CMOS image sensor of claim 1,
    wherein the first capacitor has a first capacitance and the second transistor has a second capacitance, and
    wherein the first capacitance is lower than the second capacitance.

4. The CMOS image sensor of claim 1, wherein the first capacitor is connected between the first and second nodes; such that, during the second readout phase, both the first and second capacitors are coupled to the first node in parallel, whereby the photodiode charge generated is stored by both the first capacitor and the second capacitor.

5. The CMOS image sensor of claim 1, wherein the charge amplifier further comprises an NMOS amplifier transistor having a first terminal connected to the second node, a second terminal connected to the first voltage source, and a gate terminal coupled to the first node.

6. The CMOS image sensor of claim 1,
wherein the first capacitor comprises at least one MOS capacitor connected between the first node and the second node,
wherein the second capacitor comprises at least one MOS capacitor connected between the mode control transistor and the second node, and
wherein the mode control transistor comprises an NMOS transistor.

7. The CMOS image sensor of claim 1, wherein the charge amplifier further comprises an NMOS amplifier transistor having a first terminal connected to the second node, a second terminal connected to the first voltage source, and a gate terminal coupled to the first node.

8. The CMOS image sensor of claim 1, wherein the first pixel further comprises a transfer gate connected between the photodiode and the first node.

9. The CMOS image sensor of claim 8,
wherein the first pixel further comprises a pull-up transistor connected between a second voltage source and the gate terminal of the NMOS amplifier transistor, and
wherein the CMOS image sensor further comprises means for turning on the pull-up transistor when said select transistor is turned off, whereby the NMOS amplifier transistor is turned on to prevent leakage through the transfer gate during an integration period.

10. The CMOS image sensor of claim 9, wherein said means for turning on the pull-up transistor comprises means for applying an inverse of said select control signal to a gate terminal of said pull-up transistor.

11. The CMOS image sensor of claim 1, wherein said first pixel further comprising a reset transistor connected between the first and second nodes, thus coupling the first and second nodes to cause said NMOS amplifier to form a diode when said reset transistor is turned on.

12. The CMOS image sensor of claim 1, wherein the first pixel further comprises a plurality of photodiodes and a plurality of transfer gates, each of said plurality of transfer gates being connected between an associated one of said plurality of photodiodes and the charge amplifier.

13. The CMOS image sensor of claim 12, further comprising means for simultaneously turning on all of said plurality of transfer gates to transfer charges from all of said plurality of photodiodes to the charge amplifier during a first operating mode, and for sequentially turning on each of said plurality of transfer gates to transfer individual charges from each of said plurality of photodiodes to the charge amplifier during a second operating mode.

14. The CMOS image sensor of claim 1, further comprising a plurality of second pixels arranged with the first pixel in a column, wherein each of said plurality of second pixels is connected to said at least one current source by way of said signal line.

15. The CMOS image sensor of claim 1, wherein the photodiode comprises a partially pinned photodiode structure including an n-type implant formed in a P-type bulk region and a P-type pinning layer formed over a portion of the n-type implant where a region surrounding the anode contact is left without the pinning layer.

16. A CMOS image sensor comprising a control/readout circuit and a plurality of pixels,
wherein each pixel comprises:
a photodiode connected between a first voltage source and a first node; and
a select transistor connected between a signal line and a second node;
a charge amplifier coupled between the first node and the second node, the charge amplifier including:
a first capacitor connected between the first and second nodes;
a second capacitor having a first terminal connected to the second node; and
a mode control transistor connected between the first node and the second capacitor, and
wherein the control circuit includes means for de-activating the mode control transistor during a first readout phase such that the second capacitor is de-coupled from the first node and a charge generated by the photodiode is stored only on the first capacitor, and for activating the mode control transistor during a second readout phase such that the second capacitor is coupled to the first node and the charge generated by the photodiode is stored by both the first capacitor and the second capacitor.

17. The CMOS image sensor of claim 16, further comprising means for generating a final HDR image value by processing a first readout signal generated on the signal line during the first readout phase and a second readout signal generated on the signal line during the second readout phase.

18. The CMOS image sensor of claim 16, further comprising means for generating a predetermined column voltage by charging, through a column current, a gate-to-source voltage of the NMOS amplifier transistor, whereby the reset transistor is turned on which connects NMOS amplifier transistor in a diode configuration.

19. The CMOS image sensor of claim 16, wherein the first pixel further comprises:
a transfer gate connected between the at least one photodiode and the first node; and
a reset transistor between the first and second nodes, wherein the reset transistor connects the NMOS amplifier transistor in a diode configuration while turned on.

20. The CMOS image sensor of claim 16,
wherein the first pixel further comprises a pull-up transistor connected between a second voltage source and the gate terminal of the NMOS amplifier transistor, and
wherein the CMOS image sensor further comprises means for turning on the pull-up transistor when said select transistor is turned off, whereby the NMOS amplifier transistor is turned on to prevent leakage through the transfer gate during an integration period.

21. A CMOS image sensor comprising:
an array including pixels arranged in a plurality of columns, each said column including an associated group of said pixels;
a plurality of signal lines;
a control/readout circuit, and
a plurality of current sources, each current source onto one of said signal lines of said plurality of signal lines,
wherein each pixel of a first associated group of said pixels is connected to an associated signal line of said plurality of signal lines, and each pixel includes:

a partially pinned photodiode coupled between a first voltage source and a first node; and a select transistor connected between said associated signal line and a second node;

a charge amplifier coupled between the first node and the second node, the charge amplifier including:

a first capacitor coupled between the first and second nodes;

a second capacitor having a first terminal connected to the second node; and a mode control transistor connected between the first node and the second capacitor, wherein the control/readout circuit comprises:

means for de-activating the mode control transistor of said each pixel during a first readout phase such that the second capacitor is de-coupled from the first node and a charge generated by the photodiode is stored only on the first capacitor, and for activating the mode control transistor of said each pixel during a second readout phase such that the second capacitor is coupled to the first node and the charge generated by the photodiode is stored by both the first capacitor and the second capacitor; and means for generating a final HDR image value by processing a first readout signal generated on said associated signal line during the first readout phase and a second readout signal generated on said associated signal line during the second readout phase.

* * * * *